G. GORTON.
STOCK FEEDING DEVICE FOR CUTTING OFF MACHINES.
APPLICATION FILED MAY 16, 1918.
1,284,652.
Patented Nov. 12, 1918.
2 SHEETS—SHEET 1.
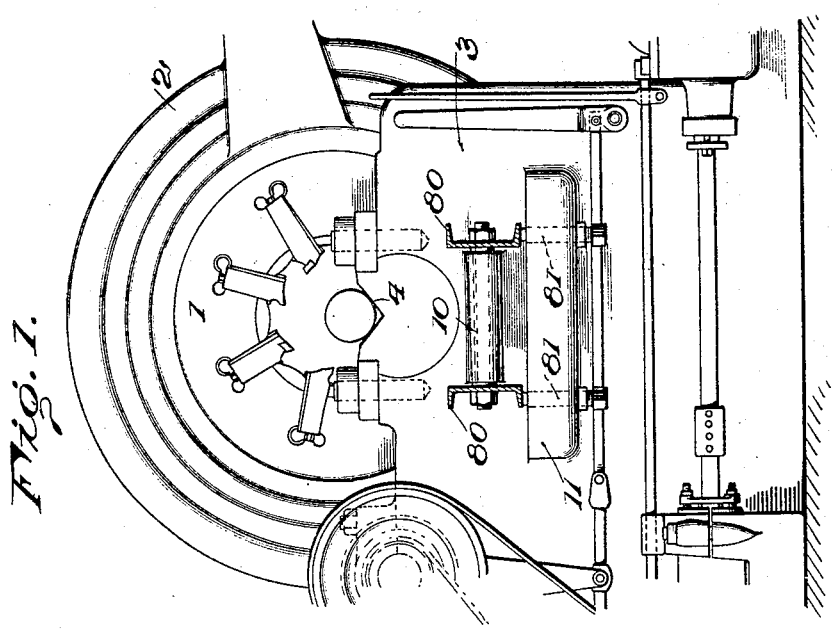
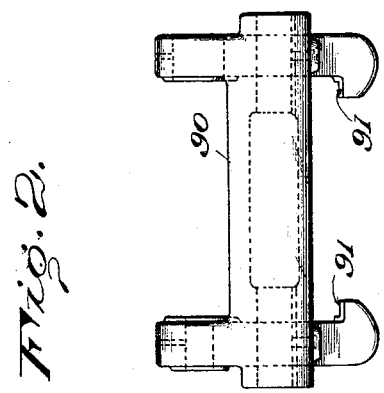
Inventor
George Gorton
By
Hubert E. Pick   Attorney

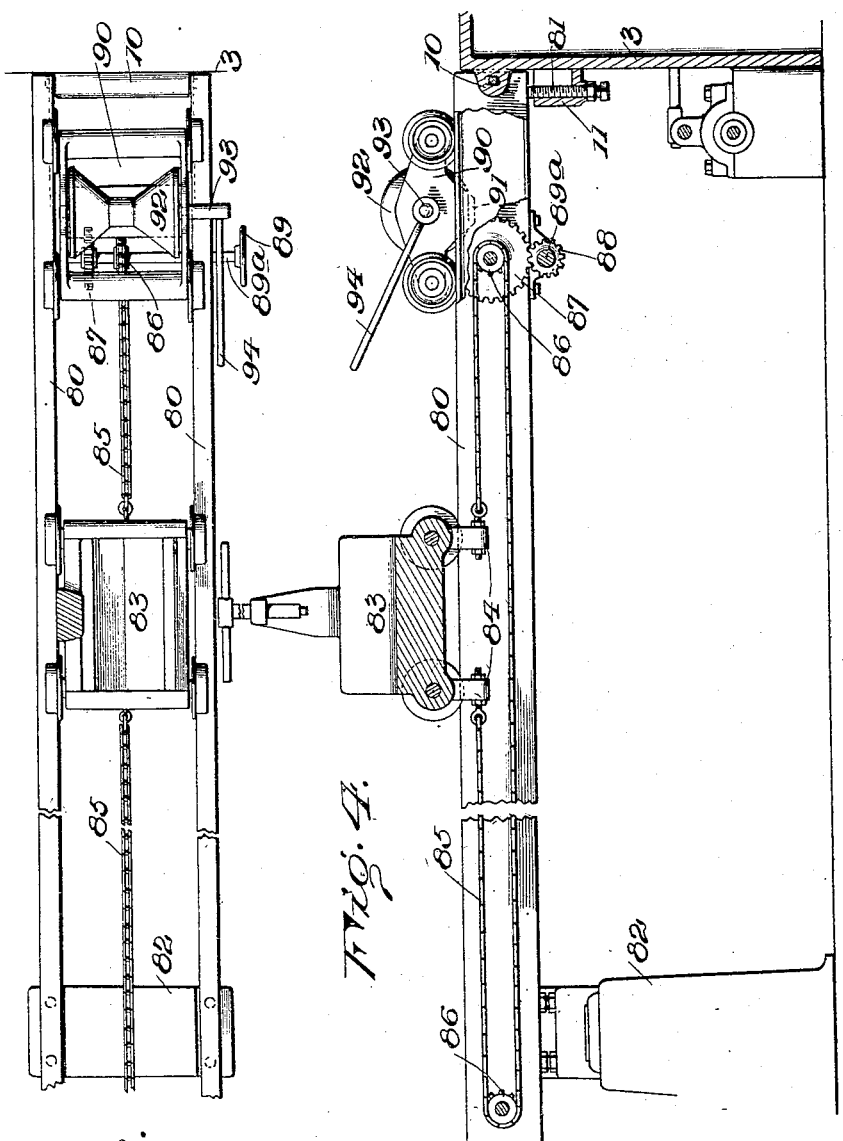

UNITED STATES PATENT OFFICE.

GEORGE GORTON, OF RACINE, WISCONSIN.

STOCK-FEEDING DEVICE FOR CUTTING-OFF MACHINES.

1,284,652.  Specification of Letters Patent.  Patented Nov. 12, 1918.

Original application filed December 1, 1915, Serial No. 64,557. Divided and this application filed May 16, 1918. Serial No. 234,890.

*To all whom it may concern:*

Be it known that I, GEORGE GORTON, a citizen of the United States, and resident of Racine, county of Racine, and State of Wisconsin, have invented certain new and useful Improvements in and Relating to Stock-Feeding Devices for Cutting-Off Machines, of which the following is a specification, this application being filed as a division of my application filed December 1, 1915, Serial No. 64,557, for cutting-off machines and the like.

This invention relates to certain improvements in and relating to stock feeding devices for cutting off machines; and the objects and nature of the invention will be readily understood by those skilled in the art in the light of the following explanation of the accompanying drawings illustrating what I now believe to be the preferred embodiment of the invention from among other forms, constructions and arrangements within the spirit and scope thereof.

An object of the invention is to provide improved means for conveniently handling and feeding the stock forwardly into the cutting off machine after the completion of each cutting off operation.

A further object of the invention is to provide certain improvements in arrangements and combinations of parts for the production of highly advantageous apparatus forming a part of cutting off machinery whereby stock can be conveniently and accurately manipulated and moved forward into operative position with respect to the cutting off mechanism.

The invention consists in certain novel features in construction and in combinations and arrangements as more fully and particularly set forth and specified hereinafter.

Referring to the accompanying drawings:

Figure 1, is an elevation showing portions of a cutting off machine, the stock feed track being shown in cross section.

Fig. 2, is a detail elevation of the body of the wheeled truck that carries the grooved stock supporting roller.

Fig. 3, is a top plan of the stock feeding device, portions being broken away.

Fig. 4, is an elevation, portions being broken away and other parts shown in vertical section.

In the particular example illustrated, I show a cutting off machine of the "Gorton" type having a rotary saw blade 1, with a center work receiving opening around which the cutters are located, and a suitable carriage 2, actuated by feed works to move the carriage on its feed and return strokes to carry the saw through the stock or work and back to normal position.

The carriage is mounted in and supported by a suitable base 3, at its top front edge having a transverse V-trough or block 4, forming the lower or fixed jaw of a suitable stock clamp in which the work or stock is fixedly held during the cutting operation.

At its front side the base is preferably cast or formed with a forwardly projecting lug 10, and below the lug with a forwardly projecting pan-like shelf 11, also cast with the base. The front wall of the base can be formed with an opening for the flow of liquid from the pan like shelf into the base, as the shelf can catch cooling liquid falling from the work and rotary cutter, and deliver the same back into the base from which it was pumped to flood the cutters while at work.

In view of the length and great weight of the stock usually operated on by cutting off machines, and the usual necessity for rapid handling of the stock to permit approximately continuous cutting off operations, I provide what is termed a stock rack for feeding the stock forward into the cutting off blade after each cut. In the example illustrated, this stock rack includes a pair of parallel spaced elongated beams, or rails 80, rigidly secured together and mounted on suitable supporting legs 82, and at their front ends bolted to the lug 10, of the machine base, and at the lower edges of their front ends resting on the upper ends of vertical bolts 81, vertically adjustable through and carried by the shelf or pan 11, of the base, to aid in leveling the tracks. A stock truck, trolley or carriage 83, is provided to travel on the tracks and consists of a strong metal block provided, in this instance, with four wheels traveling on the two tracks.

This block is formed with a top longitudinal V groove or trough to longitudinally receive and center the stock and if so desired, with a vertically adjustable screw for clamping the stock in the trough.

Means are provided for propelling the carriage and its load along the track. The front and rear ends of the block or body of the carriage are formed with depending lugs 84, to which the opposite ends of a sprocket chain 85, are secured by eye bolts or other suitable means.

The sprocket chain is arranged between the tracks or rails and passes over sprocket wheels 86, at the opposite end portions of the tracks. The sprocket wheel at the front end portion of the track is fixed to a cross shaft spaced a distance back from the machine base and provided with a gear wheel 87, meshing with a pinion 88, carried by a cross shaft provided with a hand wheel 89, at the exterior of the tracks. The chain including the carriage forms an endless connection so that the carriage can be propelled longitudinally of the track in either direction by rotating the hand wheel 89.

Between the carriage 83, and the machine base, a wheeled truck 90, is arranged and movable on the tracks. This truck consists of a block or body having a floor 91, and elevated side walls between which a conical roller 92, is arranged on an eccentric shaft or axis 93, provided with an exterior lever handle 94. The eccentric shaft 93, constitutes the shaft or axis on which the roller is rotatable and is so arranged that when the shaft is partially rotated to one direction the roller will be lowered with its end peripheral edges resting on the floor 91, in which position the roller is non-rotatable. The eccentric shaft is also so arranged that when partially rotated to another position the roller will be elevated from said floor and will then be freely rotatable on the shaft as its axis.

My patent No. 1,063,789, June 3, 1913, discloses this eccentric shaft mounting for raising and lowering the grooved stock supporting and elevating roller, but in the construction of said patent the shaft and roller are mounted in and carried by a fixed saddle.

The depression of the roller 92, is alined with the trough of the carriage and is adapted to receive and center the stock resting in the trough of the carriage. These troughs of the carriage and roller are also alined with the V-jaw or trough arranged transversely of the side wall of the machine base and the work receiving opening of the cutter blade so that the stock can be moved forward in said troughs and through said cutter blade until the desired length of stock to be cut off projects rearwardly beyond the blade. Where a length of stock is to be placed in the machine for severing into lengths, the carriage, through the medium of the hand wheel and chain, is propelled rearwardly along the tracks to receive the rear end of the length of stock, and the wheeled truck is then pushed by hand rearwardly along the track to a position to receive the front end of said stock, the conical roller of said truck being in lowered non-rotary position. The length of stock is then placed in the V-trough of the carriage and the trough formed by the depression of the roller of the truck, and is clamped if so desired, by the clamping screw of the carriage.

The stock with its ends resting in the carriage and truck is then propelled forward toward the rotary cutting off blade, by actuation of the hand wheel and chain, until the front wheels of the truck engage the front side of the base of the cutting off machine. The front end of the stock will then be at and level with the V jaw or trough of the machine base.

The eccentric shaft of the roller of the truck is then turned by its lever handle to elevate said roller to rotary position. This act elevates the front end of the stock to a level above that of the surfaces of said base jaw that would engage the stock. The hand wheel and chain are then manipulated to propel the carriage forward to carry the stock the required distance through the work receiving opening of the cutter blade. When the stock has been thus adjusted, the eccentric shaft is turned by its handle to depress the conical roller to non-rotary position and to drop the stock down to its seat in the V-jaw of the machine base to which it is then clamped by appropriate mechanism. After the required length of stock has been severed, the conical roll is raised to rotary position and the stock is again propelled forward thereover the required distance, by the carriage actuated by the hand wheel and chain. The roller is then again operated to lower the stock into the base jaw. This operation is repeated until the entire length of stock is divided up as required.

It is evident that various changes, modifications and variations might be resorted to without departing from the spirit and scope of my invention, and hence I do not wish to limit myself to the exact disclosure hereof except as required by the scope of the appended claims.

What I claim is:—

1. A cutting off machine comprising a base having a lug and shelf at its front side in combination with a stock rack comprising a track secured to said lug and resting on said shelf, and a stock trolley on said track.

2. A cutting off machine comprising a base having a front forwardly projecting shelf provided with a vertically adjustable screw extending upwardly therethrough, and a stock rack comprising a track secured to the base above said shelf and resting on the upper end of said screw, and a stock trolley movable on said track.

3. A stock rack comprising a track extending from a cutting off machine or the like, a wheeled stock trolley movable on said track for feeding stock to said machine, a wheeled stock truck separate from said trolley and also movable on said track and adapted to support the portion of the stock adjacent to the machine and to be propelled toward the machine with the trolley through the medium of the stock, and propelling means applied to the trolley, substantially as described.

4. A stock rack comprising a track extending to a cutting off machine base or the like, a wheeled stock trolley movable on said track, means for propelling said trolley in either direction on said track, and a wheeled truck also movable on said track and provided with a stock supporting roller, said truck being arranged between said trolley and said base, substantially as described.

Signed

GEORGE GORTON.